(12) United States Patent
Giefer et al.

(10) Patent No.: US 8,448,536 B2
(45) Date of Patent: May 28, 2013

(54) ACTUATING DEVICE HAVING A LOCKING ROLLER

(75) Inventors: Andreas Giefer, Lemforde (DE); Ludger Rake, Diepholz (DE); Sascha Rosentreter, Espelkamp, DE (US)

(73) Assignee: ZF Friedrichshafen AG, Friedrichshafen (DE)

( * ) Notice: Subject to any disclaimer, the term of this patent is extended or adjusted under 35 U.S.C. 154(b) by 561 days.

(21) Appl. No.: 12/745,778

(22) PCT Filed: Dec. 4, 2008

(86) PCT No.: PCT/DE2008/050038
§ 371 (c)(1),
(2), (4) Date: Jun. 2, 2010

(87) PCT Pub. No.: WO2009/080019
PCT Pub. Date: Jul. 2, 2009

(65) Prior Publication Data
US 2010/0263475 A1    Oct. 21, 2010

(30) Foreign Application Priority Data
Dec. 21, 2007 (DE) .......................... 10 2007 062 824

(51) Int. Cl.
*B60K 20/00* (2006.01)
(52) U.S. Cl.
USPC ........................ 74/473.21; 74/335; 74/473.25
(58) Field of Classification Search
USPC .......... 74/335, 473.1, 473.21, 473.24, 473.25
See application file for complete search history.

(56) References Cited

U.S. PATENT DOCUMENTS

| | | | | |
|---|---|---|---|---|
| 5,509,322 | A | * | 4/1996 | Anderson et al. ................ 74/335 |
| 5,768,944 | A | * | 6/1998 | Inuzuka et al. .............. 74/473.1 |
| 6,382,046 | B1 | | 5/2002 | Wang |
| 7,013,748 | B2 | * | 3/2006 | Satoh et al. ................. 74/473.12 |
| 7,650,810 | B2 | * | 1/2010 | Levin et al. .............. 74/471 XY |
| 7,921,746 | B2 | * | 4/2011 | Giefer et al. ................ 74/473.23 |
| 8,312,786 | B2 | * | 11/2012 | Ueta et al. .................. 74/473.23 |
| 8,316,734 | B2 | * | 11/2012 | Giefer et al. ................ 74/473.25 |
| 2003/0188594 | A1 | | 10/2003 | Levin et al. |
| 2006/0016287 | A1 | | 1/2006 | Grossman et al. |

(Continued)

FOREIGN PATENT DOCUMENTS

| DE | 404 452 | 10/1924 |
|---|---|---|
| DE | 100 59 383 A1 | 6/2002 |

(Continued)

OTHER PUBLICATIONS

Corresponding Japanese Office Action Mailed on Jan. 29, 2013.

*Primary Examiner* — David M Fenstermacher
(74) *Attorney, Agent, or Firm* — Davis & Bujold, PLLC

(57) ABSTRACT

An actuating device for selecting fixed gear ratios of a gear shifting transmission. The actuating device comprises a shift lever movable between at least three gear positions, and a lockout mechanism for limiting the range of motion of the shift lever. The lockout mechanism comprises a locking assembly including at least one locking chamber disposed in at least one locking roller, and the shift lever includes at least one locking cam. The locking cam can be inserted into the locking chamber to limit the range of motion of the shift lever. It is thus possible to implement actuating and locking tasks in the field of shift-by-wire transmissions, in a simple way and with minimal construction space requirements. The actuating device produces minimal noise and has short shifting times, and makes it shift-by-wire-controlled H shift patterns possible.

12 Claims, 3 Drawing Sheets

U.S. PATENT DOCUMENTS

| | | |
|---|---|---|
| 2006/0096402 A1 * | 5/2006 | Choi et al. ............... 74/473.12 |
| 2007/0193385 A1 * | 8/2007 | Hermansson et al. ....... 74/473.1 |
| 2008/0028886 A1 | 2/2008 | Molkow et al. |
| 2008/0295633 A1 | 12/2008 | Giefer et al. |

FOREIGN PATENT DOCUMENTS

| | | |
|---|---|---|
| DE | 10 2005 023 926 A1 | 11/2006 |
| DE | 10 2005 033 510 A1 | 2/2007 |
| DE | 10 2007 019 465 A1 | 10/2008 |
| JP | H01-098734 U | 7/1989 |
| JP | H05-057510 A | 7/1993 |
| JP | 7 019334 A | 1/1995 |
| JP | 2006-103443 A | 4/2006 |
| WO | 2007/009415 A1 | 1/2007 |
| WO | 2008/116874 A1 | 10/2008 |

* cited by examiner

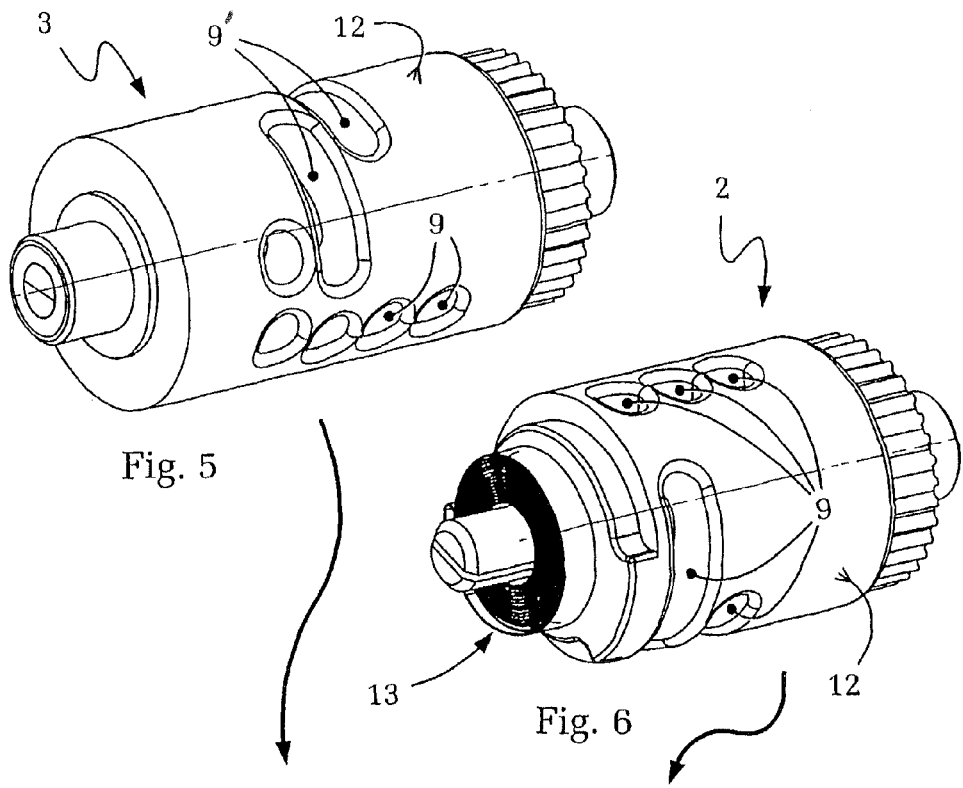
Fig. 5
Fig. 6
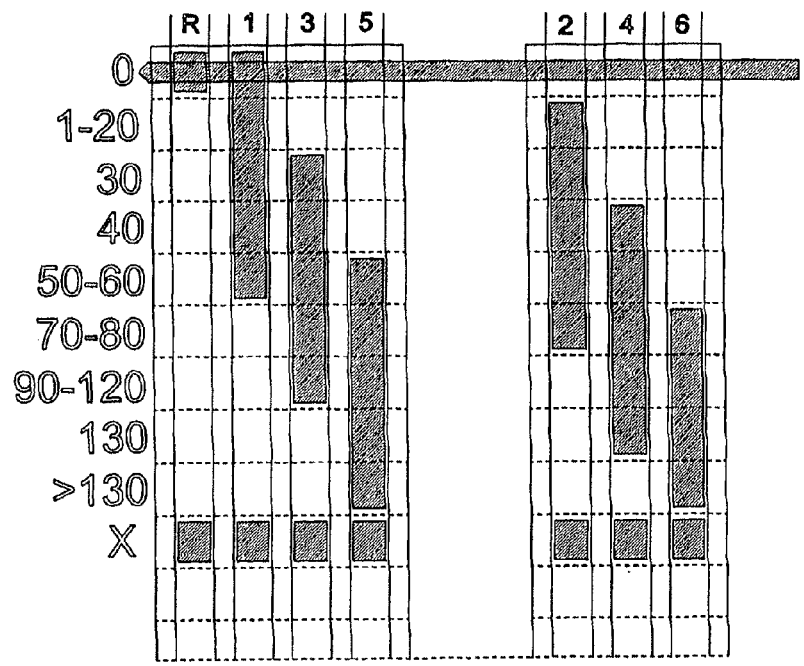
Fig. 7

ACTUATING DEVICE HAVING A LOCKING ROLLER

This application is a National Stage completion of PCT/DE2008/050038 filed Dec. 4, 2008, which claims priority from German patent application serial no. 10 2007 062 824.4 filed Dec. 21, 2007.

FIELD OF THE INVENTION

The invention relates to an actuating device for a gear shifting transmission, e.g. for an automated manual transmission having shift-by-wire actuation.

BACKGROUND OF THE INVENTION

Gear shifting transmissions of motor vehicles are shifted or controlled in general using an actuating device located within reach of the driver. Actuating elements such as shift levers or selector levers are used regularly for this purpose, and are located, for example between the front seats of the motor vehicle or in other regions of the cockpit.

In the case of manually shifted transmissions in particular, purely mechanical actuating devices and transfer means are often still used between the actuating element and the gear shifting transmission. These can be mechanical transfer elements such as cables or linkages, for example, between the actuating element and the transmission. Newer manual transmissions for passenger cars usually include five or six forward gears and one reverse gear, wherein these six or seven gear positions of the shift lever are disposed, in general, in the form of an H shift pattern, grouped around a center, neutral middle position of the shift lever.

An H shift pattern for a mechanically actuated manual transmission often requires considerably more construction space for the actuating system in the region of the vehicle interior, however, due to the shifting travel and the selector travel required at the transmission, and due to certain actuating forces on the shift lever that cannot be exceeded for reasons of ergonomics, in particular compared to a selector lever of an automatic transmission or to a shift-by-wire control for an automatic transmission.

However, since different actuating systems must be provided for various variants of a motor vehicle having different types of transmissions, this means that the vehicle interior must therefore likewise be adapted to the construction space required for the actuating system, for example in the region of the center console, the cockpit, or the floor panel, depending on the type of vehicle transmission and, therefore, on the type of actuating system that is used. Therefore, depending on the type of transmission that is used, or on the type of actuating device that is used, this can result in the need to make complex changes to the aforementioned assemblies in the region of the vehicle interior, which is associated with correspondingly high costs. A further disadvantage that can be associated with the mechanical transfer of shift commands between the actuating device and the gear shifting transmission of the motor vehicle lies in the need for the cables or linkages to pass through the vehicle floor panel, the driveshaft tunnel, or the bulkhead of the motor vehicle. These passages are likewise structurally complex, and can also be disadvantageous in terms of noise production, the transmission of structure borne noise, and crash behavior.

Attempts have been made to circumvent these disadvantages, which occur in the prior art, by converting gear shifting transmissions of motor vehicles, including manual transmissions, to shift-by-wire actuation. The purpose of this was to obtain greater design flexibility in the vehicle interior in terms of the design and placement of the actuating device for the transmission. Due to the elimination of mechanical transmission linkage and spatially extensive mechanical actuating levers, it is hereby also made possible to provide the most uniform assemblies possible in the region of the cockpit, the floor panel, and the center console for all variant transmissions of a motor vehicle.

Even in the case of shift-by-wire actuating devices for motor vehicle transmissions, however, it is necessary to provide the driver with a realistic feel for the actuation of the transmission, for reasons of safety and ergonomics. It is therefore necessary that the driver be provided with visual feedback as well as clear haptic or tactile feedback regarding the current shifting state or operating state of the transmission when the transmission is actuated.

For reasons of ergonomics and safety, it is therefore particularly important that the driver receive clear haptically noticeable signals that certain shifting states or shift operations are not permitted at a particular moment in the form of the corresponding operating positions of the shift lever being blocked; the driver is already familiar with this situation from the use of fully synchronized mechanical manual transmissions, for example, with their rotational speed-dependent and speed-dependent synchronizer locks.

However, when gear shifting transmissions are actuated electrically or using shift-by-wire, the actuating element in the passenger compartment and the motor vehicle transmission in the engine compartment are not mechanically coupled in this manner. Instead, in the case of "shift-by-wire" transmissions, the shift commands are transmitted from the actuating device to the motor vehicle transmission using electrical or electronic signals, and the shift commands are then usually implemented at the transmission using electrohydraulics. Due to the absence of a mechanical connection between the transmission actuator system and the actuating lever, however, the transmission state, any shift interlocks, or impermissible shift commands can no longer react directly to the state of the actuating lever. Since certain gear positions are not noticeably blocked at the actuating lever, the driver of a vehicle equipped with a shift-by-wire transmission is unable to easily recognize that certain lever positions, gear selections, or shift commands may not be permitted in the current driving condition and therefore cannot be selected.

Depending on the state of the gear shifting transmission to be operated, and depending on other factors of the state of the motor vehicle, e.g. engine speed, vehicle speed, clutch position, etc., in order to implement the necessary haptic feedback in shift-by-wire-controlled transmissions, it is generally necessary to limit the range of operation of the actuating lever in an actuator-controlled manner and depending on the transmission state. In this manner, when the driver grasps the actuating lever, he can be notified in a haptically noticeable manner, even when the vehicle is equipped with a shift-by-wire-controlled transmission, that his shift request is not permitted and is therefore blocked, for example due to the current speed of the motor vehicle or due to a current operating state of the gear shifting transmission. It is therefore possible to prevent shift commands that cannot be implemented by the transmission at the moment, and that are detected by the transmission electronic unit and are not transmitted to the transmission from being engaged at the actuating element since deviations between the actual transmission state and the shift position that was engaged at the actuating element are not permitted.

To this end, the driver of a vehicle equipped with a shift-by-wire-controlled transmission must experience the same haptic reaction he would if using a mechanically actuated transmission—a manual transmission that includes transmission linkage, for example—when he makes an actuation attempt, in which shifting of the individual gears is blocked at the shift lever, in particular, depending on the speed. In this manner, the shifting of gears that are not permitted at the moment, or gear selections that cannot be shifted by the transmission at the moment are ignored electronically, and in fact are prevented at the actuating element using a mechanical lock even before actuation is attempted.

As described in US 2006/0016287 A1 or DE 10 2005 033 510 A1, for example, attempts have been made to implement locks of this type by equipping actuating levers of shift-by-wire-controlled gear shifting transmissions with a plurality of actuators or multiple-action actuators, and with appropriate lever elements or transmission elements to selectively block impermissible shift commands. These actuators and the lever elements or transmission elements they control are shifted depending on the vehicle state or transmission state to thereby limit the overall range of motion of the actuating element in accordance with the current drive state or transmission state.

However, if a plurality of different lever positions in different combinations must be blocked using actuators, then, according to the prior art, a complex locking mimicry is often required for this purpose. This has unwanted consequences due to the complexity and costs involved. Problems can also arise in terms of the available construction space in the region of the actuating device, and in terms of energy consumption and heat generation.

This applies in particular when the aim in terms of a shift-by-wire actuating device is to implement an H shift pattern, for example, to control an automated manual transmission. The latter is very difficult to implement using the lockout mechanisms known from the prior art in particular since an H shift pattern can include two and even up to four adjacently disposed shift gates, in which shift positions must be blocked or unblocked, depending on the state.

SUMMARY OF THE INVENTION

Proceeding from this background, the object of the present invention is to create an actuating device having a lockout mechanism, in particular for the electrical or electronic shift-by-wire actuation of a gear shifting transmission, using which the stated disadvantages of the prior art can be overcome. The lockout mechanism should have a simple design, even when the locking logic is complex, and rapid shifting times, a low susceptibility to interference, low energy consumption, and minimal noise production should be attained. Furthermore, the actuating device should require as little construction space as possible, and costs should be reduced compared to the conventional mechanical transmission of shift commands, and compared to the shift-by-wire actuating devices known from the prior art.

Considered, at first on its own, in the known manner, the actuating device according to the present invention includes a shift lever that can be moved within at least one shift gate and has at least three gear positions, and includes one lockout mechanism. The lockout mechanism is used to controllably limit the range of motion of the shift lever, to exclude certain shift lever positions, or to block the shift lever, in particular depending on the gear state of the transmission or the driving condition of the motor vehicle.

According to the invention, however, the actuating device is characterized in that the lockout mechanism includes a locking chamber assembly that includes at least one locking chamber and is disposed in at least one actuatorically rotatable locking roller. In addition, the shift lever includes at least one locking cam, wherein the locking cam can be engaged with the locking chamber assembly when inserted into the locking chamber and thereby enabling or limiting the motion of the shift lever, in particular depending on the current effective depth of the locking chamber.

Compared to the prior art, from which mainly actuating devices are known that include either actuators having a plurality of operating positions (such as double-acting electromagnets, for example), a plurality of actuators, or complicated locking mimicry with various transmission elements, it is finally possible, due to the locking roller according to the invention, to greatly simplify the design of the actuating device. Nevertheless, a great deal of freedom still exists in regards to designing the desired ranges of motion or the number of shift stages for the shift lever, which is limited only by the largely unrestricted shaping of the locking chamber assembly in the locking roller.

Due to the invention, the mechanical transmission of shift commands from the actuating device to the transmission using cables or linkages can therefore be replaced by the transmission of shift commands using electronic means, in a largely universal manner for all types of transmissions and for all types of actuating devices, while simultaneously retaining the haptic sensation known from the mechanical transmission of shift commands. This applies in particular for the haptic feedback of the shift lever related to impermissible shift commands outside of a certain window of relative rotational frequency or speed.

The invention therefore results in considerably greater freedom in regards to the design and placement of the actuating device in the vehicle interior or cockpit. Since the locking chamber assembly can be designed largely without geometric restrictions, thereby making it possible to define practically any range of motion having practically any number of different shift positions for the shift lever. Furthermore, the actuating device according to the invention can be adapted to the most diverse vehicle transmissions or customer requirements simply by replacing the locking roller, in the sense of a modular system, without having to redesign the entire actuating device or the surrounding assemblies in the motor vehicle. Due to the invention, decisive savings in terms of cost and construction space are therefore made possible.

The invention can be implemented regardless of how the at least one locking roller and the locking chamber assembly accommodated therein are implemented, designed, and disposed, provided the intended interaction of the locking chamber assembly with the at least one locking cam of the shift lever is ensured. According to particularly preferred embodiments of the invention, however, the locking chamber assembly of the at least one locking roller includes a plurality of locking chambers that are adjacently disposed along the rotational axis of the locking roller.

Furthermore, the actuating device preferably includes not one but two actuatorically rotatable locking rollers, and the shift lever includes two locking cams that are situated opposite one another relative to the shift lever axis. The locking chamber assembly of the first locking roller is assigned to the first locking cam of the shift lever, and the locking chamber assembly of the second locking roller is assigned to the second locking cam of the shift lever. In this manner, motions of the shift lever that start from a center position and continue forward or backward relative to the direction of travel can be controlled and blocked using actuators.

The shift lever is preferably a multistable shift lever that, in contrast to a monostable shift lever, basically remains in each of its gear positions once it is released after actuation. Due to a plurality of locking chambers which are adjacently disposed along the rotational axis, and due to two actuatorically rotatable locking rollers, complete shift patterns of mechanical selector levers or shift levers can therefore likewise be implemented in entirety with a shift-by-wire actuation, in particular when a multistable shift lever is used.

Due to the embodiment of the actuating device according to the invention, which includes two locking rollers, each of which includes a plurality of adjacently disposed locking chambers, it is possible in particular to replicate and realistically simulate the entire H shift pattern of the shift lever of a manually actuated transmission. For this purpose, a separate locking chamber is provided on each of the two locking rollers, for each of the up to four adjacently disposed shift gates of a typical H shift pattern which includes five to six forward gears and one reverse gear. In this manner, the particular permissible ranges of motion can be defined and controlled separately for each of the e.g. four shift gates of the H shift pattern by assigning a pair of associated locking chambers on the two locking rollers to each shift gate.

The driver is very familiar with the principle of the conventional H shift pattern due to previous experience with mechanical actuation of manual transmissions; due to the invention, this principle can be transferred to the field of shift-by-wire controls, thereby largely ruling out misuse of a shift-by-wire-controlled manual transmission due to the H shift pattern according to the invention.

According to a particularly preferred embodiment of the invention, the at least one, preferably two locking roller(s) is/are actuated depending on the vehicle speed. This embodiment also serves to implement, as completely as possible, the H shift pattern with which the driver is familiar in a shift-by-wire-controlled gear shifting transmission, such as a by-wire-controlled double clutch transmission or an electrohydraulically actuated manual transmission.

According to a further preferred embodiment of the invention, at least one of the locking chambers, and preferably all of the locking chambers of the actuating device, includes, on at least one of its ends, a ramp-type runout that extends to the surface of the locking roller. In this manner, the shift lever can also be returned to the center or neutral position in a reliable manner using actuators, with the least effort possible and by utilizing the design of the locking roller for two purposes. As a result—in the case of manually shifted automatic transmissions in particular—a transmission control can be realized in which the transmission is automatically shifted to the parking lock (Auto-P) when the motor vehicle is shut off or left, regardless of which gear had actually been selected at the transmission control, in order to prevent the parked vehicle from rolling away.

Due to this embodiment, according to which the shift lever is returned to the center or neutral position using actuators, it can be prevented that the shift lever is located in a position that does not coincide with the "parking lock" transmission state the next time an attempt is made to drive the vehicle.

If the shift lever were left in one of the gear positions when leaving the vehicle, then, if Auto-P were engaged, the shift lever position would not coincide with the actual gear state of the transmission (parking lock) the next time the vehicle is started. Upon returning to the vehicle or attempt to start the vehicle, the position of the shift lever that the driver would observe, would provide him with incorrect information. On the basis of his observation of the shift lever position, the driver would have to assume that the transmission is engaged in a gear selection position, although the transmission is actually engaged in the parking lock.

To prevent the driver from being misinformed in this manner, an additional signal device would therefore have to be provided especially for the driver, that would, if the parking lock had been engaged by Auto-P, signal to the driver that the shift lever must first be moved manually into the center or neutral position before the vehicle can be started. A signal device of this type is not necessary, however, due to this embodiment of the invention and the actuatoric return of the shift lever according thereto.

The embodiment of the invention that includes two locking rollers and two locking cams can be implemented at this time regardless of how the actuatoric drive of the two locking rollers takes place. For example, the two locking rollers can each include a separate actuatoric drive, or they can be coupled via gears. According to a particularly preferred embodiment of the invention, however, the actuating device is characterized by one common actuatoric drive for the two locking rollers. Preferably, the two locking rollers and the actuatoric drive that is common to the two locking rollers are coupled to one another by a toothed belt, wherein the common actuatoric drive of the two locking rollers is preferably formed by a servomotor.

These embodiments make possible a cost-saving design of the actuating device having only one single electric motor actuator that can nevertheless activate all different actuating locks of the shift lever—in the various shift tracks of an H shift pattern, for example—in a targeted manner.

According to a further preferred embodiment of the invention, a rotation angle sensor is provided disposed on at least one locking roller. This makes it possible to drive and reliably adjust the rotation angle position, which is required for the particular lock, of the locking roller or locking rollers even using a relatively simple electric motor that can therefore function without the use of a separate sensor system.

According to a further preferred embodiment of the invention, it is furthermore provided that a return spring is disposed on at least one locking roller. The return spring, which can be designed e.g. in the form of a flat spiral spring, makes it possible to actuate the shift lever in particular even if the actuator drive of the locking rollers should fail, or after the ignition is shut off. In this case, the locking rollers are rotated back, using the energy stored in the return spring, to a predetermined position in which all actuating positions of the shift lever can be selected.

BRIEF DESCRIPTION OF THE DRAWINGS

The invention is explained below in greater detail with reference to drawings that merely depict examples of embodiments. They show:

FIG. 5 in a schematic, isometric view, the locking roller at the rear, relative to the direction of travel;

FIG. 6 in a depiction and view that correspond to FIG. 5, the locking roller at the front, relative to the direction of travel, with return spring; and FIG. 7 the assignment table of the locking chambers for the locking rollers according to FIGS. 5 and 6.

DETAILED DESCRIPTION OF THE PREFERRED EMBODIMENTS

Figure 1:
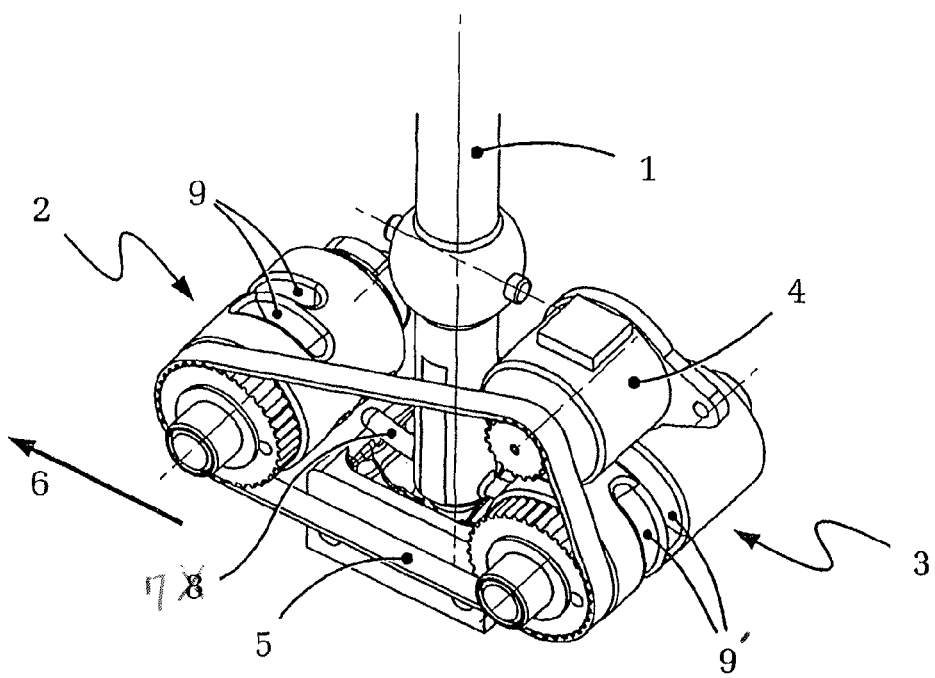
FIG. 1 in a schematic, isometric view, the lockout mechanism of an embodiment of an actuating device according to the present invention, in a view looking upon the toothed-belt drive.

FIG. 1 shows, in a schematic, isometric view, the lockout mechanism for an embodiment of an actuating device according to the present invention, in a view looking upon the toothed-belt drive. The illustration clearly shows (only partially, for reasons of space) shift lever 1, locking rollers 2 and 3, and electric motor drive 4 and its toothed-belt drive 5 for controlling the rotation of locking rollers 2 and 3. Direction arrow 6 indicates the direction of travel of the motor vehicle that applies for this embodiment.

Figure 2:
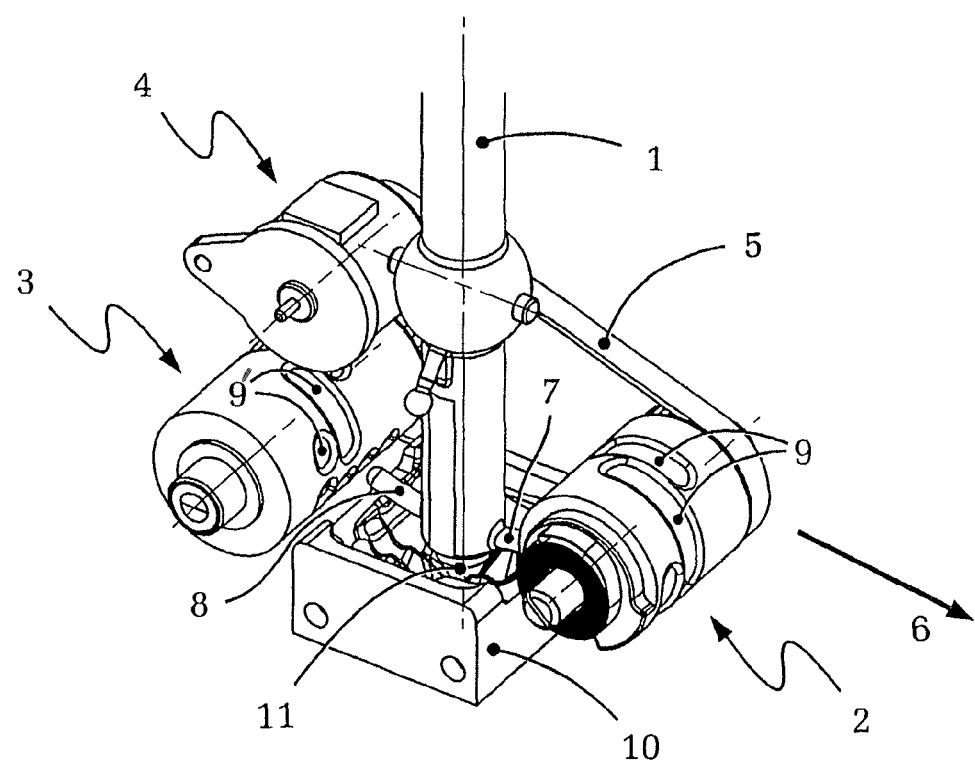
FIG. 2 the lockout mechanism according to FIG. 1, in a depiction that corresponds to FIG. 1, in a view looking upon the locking rollers and actuator drive.

FIG. 2 shows the situation according to FIG. 1 from the opposite viewing direction, looking upon locking rollers 2, 3 and electric motor 4. FIG. 2 shows, in particular, locking cams 7, 8 which are disposed on shift lever 1 and, in this embodiment, are formed as a single piece with shift lever 1. Locking cams 7, 8 are disposed such that they are inserted into corresponding locking chambers 9,9' of locking rollers 2, 3 when shift lever 1 is swivelled.

Depending on the rotational angle position of locking rollers 2, 3 wherein the rotation angle position is controlled by servoactuator 4 via toothed-belt drive 5—a different arrangement of locking chambers 9,9' affects locking cams 7, 8, thereby enabling the corresponding shift motions of shift lever 1 to be released or blocked depending on the rotational angle position of locking rollers 2, 3.

FIG. 2 also clearly shows notched gate 10 and interlock pin 11 which is guided into notched gate 10 and is axially spring-loaded. Notched gate 10 and interlock pin 11 are used for defined guidance and to produce the locking forces and restoring forces required for reasons of ergonomics and shift logic, when shift lever 1 is moved.

Figure 3:
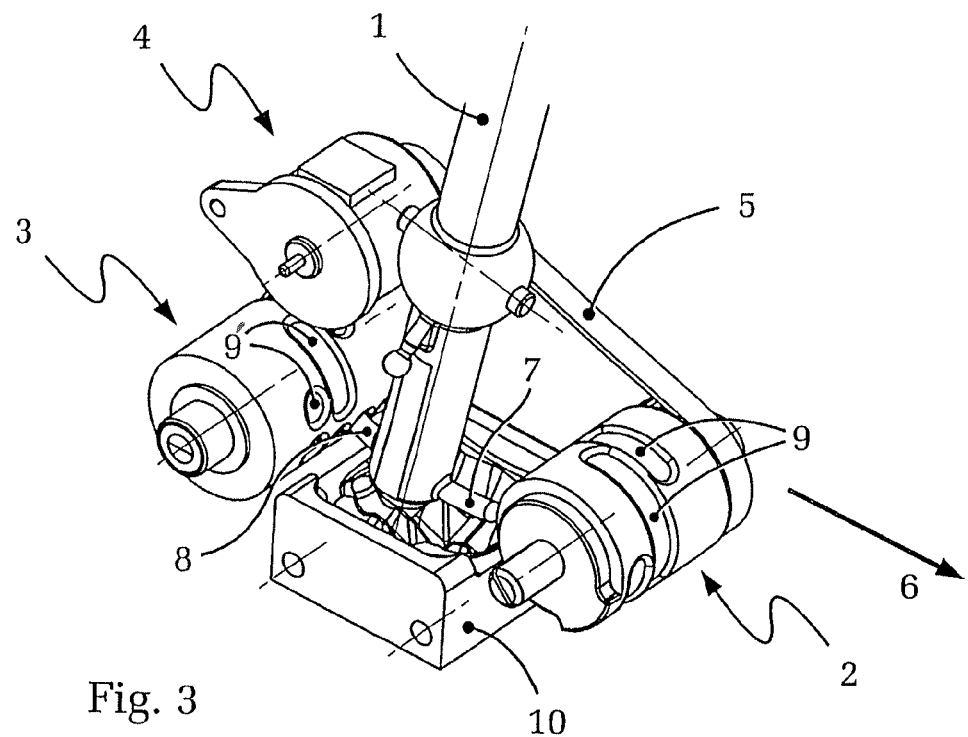
FIG. 3 the lockout mechanism according to FIG. 2, in a depiction that corresponds to FIG. 2, with the shift lever deflected and the locking cam plunged into locking chamber.
Figure 4:
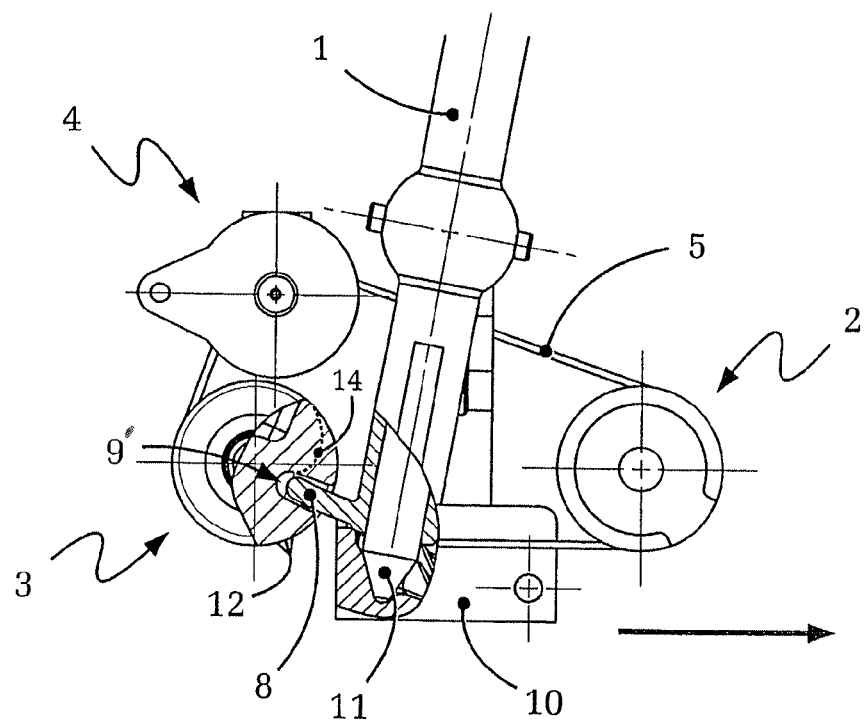
FIG. 4 in a schematic, partial cross sectional side view, the lockout mechanism according to FIGS. 2 and 3, with the shift lever deflected as in FIG. 3.

FIGS. 3 and 4 show locking cams 7, 8 inserted into corresponding locking chambers 9, 9' of locking rollers 2, 3. FIGS. 3 and 4 clearly show shift lever 1 which has been swiveled forward relative to direction of travel 6. When shift lever 1 is swiveled, locking cam 8 is likewise swiveled, and inserts into one of the locking chambers 9' of the rear—relative to the direction of travel—locking roller 3, provided the latter is located in an appropriate rotation angle position.

However, if the swivelling motion of shift lever 1 depicted in FIGS. 3 and 4 should be prevented or blocked in a manner that is noticeable to the driver—since, e.g., the vehicle speed or the relative rotational frequency in the transmission are not suitable for the particular shift command-actuator drive 4 is activated by the transmission electronic system in a manner such that no locking chamber 9', into which locking cam 8 could be inserted, is located opposite locking cam 8. In this case, when an attempt is made to actuate shift lever 1 accordingly, locking cam 8 strikes smooth surface 12 of locking roller 3. As a result, the driver receives a clear haptic signal that the shift lever cannot be moved in the intended direction at this time since this would correspond to a shift command that is impermissible at the moment (e.g. shifting into second gear when the vehicle is traveling at a high rate of speed, or shifting into reverse while the vehicle has not stopped).

When shift lever 1 is moved laterally, transversely to the direction of travel, different pairs of locking chambers 9,9' of locking rollers 2, 3 are located opposite each of the locking cams 7, 8 of shift lever 1. In this manner, different shift positions can be permitted or blocked—in particular, depending on the driving speed—for the different shift gates of shift lever 1 without having to move locking rollers 2, 3 into a different rotational angle position every time shift lever 1 is moved into a different shift gate.

FIG. 4 clearly shows, once more, the action of locking cam 8 inserted into one of the locking chambers 9' of locking roller 3, according to FIG. 3, at the rear relative to the direction of travel. Furthermore, FIG. 4 also shows notched gate 10 and interlock pin 11 which slides in notched gate 10 and is movable in shift lever 1 under axial spring loading. Furthermore, a possible embodiment of the ramp-type runout of locking chamber 9' is indicated schematically in FIG. 4 using dashed line 14. Using ramp 14, which can have a spiral shape, for example, shift lever 1 can be moved back into its center position shown in FIGS. 1 and 2 via actuator-controlled rotation of locking roller 4.

FIGS. 5 and 6 show locking rollers 3 and 2 once more, in an enlarged view. It is clearly shown that locking roller 2 is provided with a spiral return spring 13. Return spring 13 is preloaded by electric motor drive 4 of locking rollers 2 and 3 and is used, e.g. if the system should fail, to automatically return locking rollers 2, 3 into the home position, in which all shift positions of shift lever 1 can be selected since, in the home position of the locking rollers 2, 3, a corresponding locking chamber 9,9' is available for locking cams 7, 8 for every shift position of shift lever 1.

This home position of locking rollers 2, 3 corresponds to the row marked with an "X" in the table shown in FIG. 7. The column headers "R 1 3 5-2 4 6" of the table shown in FIG. 7 represent the assignment of the individual gear stages that can be selected using shift lever 1 to particular locking chambers 9,9' which are disposed on associated locking rollers 3 and 2. The row headers between "0" and ">130" stand for the ranges of vehicle speed at which actuator 4 moves locking rollers 3 (left half of the table) and 2 (right half of the table) into the particular associated rotational angle position.

The table makes clear that reverse gear and first gear can be engaged e.g. when the vehicle is at a standstill, while all other gear positions are blocked. At a speed between 50 and 60 km/h, this embodiment can select all gears except for reverse gear and sixth gear, and, at speeds above 130 km/h, only the fifth or sixth gear can be selected, while all other gears are blocked by locking cams 7, 8 striking smooth surfaces 12 of locking rollers 2, 3 outside of locking chambers 9, 9'. In home position "X", into which the two locking rollers automatically move due to return spring 13, e.g., if drive 4 fails, a locking chamber 9,9' is provided in both locking rollers for every shift position of shift lever 1, thereby making it possible for all shift positions to be selected in home position "X".

The ranges of vehicle speeds in which certain shift operations are permitted and others are excluded can be easily adapted to corresponding vehicle variants or customer preferences by making appropriate changes to locking rollers 2, 3.

In summary, it is therefore clear that with the invention, an actuating device is created that includes the particular advantage over the prior art that it functions using a relatively simple design, even when blocking tasks are complex. Substantial advantages are attained in the form of minimizing the amount of construction space required, low noise production and in the form of short shifting times coupled with a low susceptibility to interference. When H shift patterns are involved in particular, cost savings and structural advantages are attained compared to the mechanical transmission of shift commands, and compared to the shift-by-wire actuating devices known from the prior art. The driver is provided with reliable tactile feedback about the actual gear state and the current permissible shift commands.

Due in particular to the simple, modularizable design, the invention therefore makes a central contribution toward increasing cost effectiveness across all model series, and toward improving the ergonomics and safety of actuating devices for motor vehicle transmissions.

LIST OF REFERENCE NUMERALS

1 Shift lever
2, 3 Locking roller
4 Electric motor, actuator
5 Toothed-belt drive
6 Direction of travel
7, 8 Locking cam
9 Locking chamber
10 Notched gate
11 Interlock pin
12 Roller surface
13 Return spring
14 Runout ramp

The invention claimed is:

1. An actuating device for selecting a fixed gear ratio of a gear shifting transmission, the actuating device comprising:
    a shift lever (1) being movable between at least three gear positions, and
    a lockout mechanism for limiting a range of motion of the shift lever (1), for excluding certain shift lever positions, and blocking the shift lever (1), the lockout mechanism comprises a locking chamber assembly that includes at least one locking chamber (9) disposed in at least one actuatorically rotatable locking roller (2, 3), and the shift lever (1) includes at least one locking cam (7, 8), the locking cam (7, 8) being engagable with the locking chamber assembly and inserted into the locking chamber (9) for limiting the range of motion of the shift lever (1).

2. The actuating device according to claim 1, wherein the locking chamber assembly of the at least one locking roller (2, 3) has a plurality of locking chambers (9) that are adjacently disposed along a rotational axis of the locking roller (2, 3).

3. The actuating device according to claim 1, wherein the lockout mechanism has two actuatorically rotatable locking rollers (2, 3), and the shift lever (1) has two locking cams (7, 8) that are situated opposite one another relative to a shift lever axis, a first locking chamber assembly of a first locking roller (2) is assigned to a first locking cam (7), and a second locking chamber assembly of a second locking roller (3) is assigned to a second locking cam (8).

4. The actuating device according to claim 1, wherein the shift lever (1) is multi-stable.

5. The actuating device according to claim 1, wherein the at least one locking roller (2, 3) is activated depending on speed of a vehicle incorporating the actuating device.

6. The actuating device according to claim 1, wherein at least one of the locking chambers (9) of the locking chamber assembly has a ramp-type runout (14) toward a surface of the locking roller (2, 3), adjacent at least one end thereof, so that the shift lever (1) is moved actuatorically via rotation of the locking roller (2, 3) via the ramp-type runout (14).

7. The actuating device according to claim 1, wherein the actuating device has two locking rollers (2, 3) and the two locking rollers (2, 3) are actuated by a common actuatoric drive (4).

8. The actuating device according to claim 1, wherein the two locking rollers (2, 3) and the actuatoric drive (4) are coupled to one another via a common toothed belt (5).

9. The actuating device according to claim 7, wherein the common actuatoric drive is a servomotor (4).

10. The actuating device according to claim 1, wherein a rotational angle sensor is disposed on the at least one locking roller (2, 3).

11. The actuating device according to claim 1, wherein a return spring (13) is disposed on the at least one locking roller (2, 3).

12. An actuating device for selecting a fixed gear ratio of a gear shifting transmission, the actuating device comprising:
    a shift lever (1) comprising at least one locking cam (7, 8) and being shiftable between at least three gear positions;
    a lockout mechanism for limiting a shifting motion of the shift lever (1), the lockout mechanism comprising at least one locking roller (2, 3) being rotationally actuatable, and at least one locking channel (9) being located in the at least one locking roller (2, 3); and
    the locking cam (7, 8) being insertable into the locking channel (9) of the locking roller (2, 3) for limiting the shifting motion of the shift lever (1).

* * * * *